Feb. 5, 1929.

Re. 17,209

J. S. OECHSLE

ATTACHMENT FRAME FOR MOBILE UNITS

Original Filed Aug. 26, 1925 3 Sheets-Sheet 1

Inventor:
Joseph S. Oechsle,
By Fear Edelson
Attorney.

Feb. 5, 1929. Re. 17,209
J. S. OECHSLE
ATTACHMENT FRAME FOR MOBILE UNITS
Original Filed Aug. 26, 1925 3 Sheets-Sheet 2
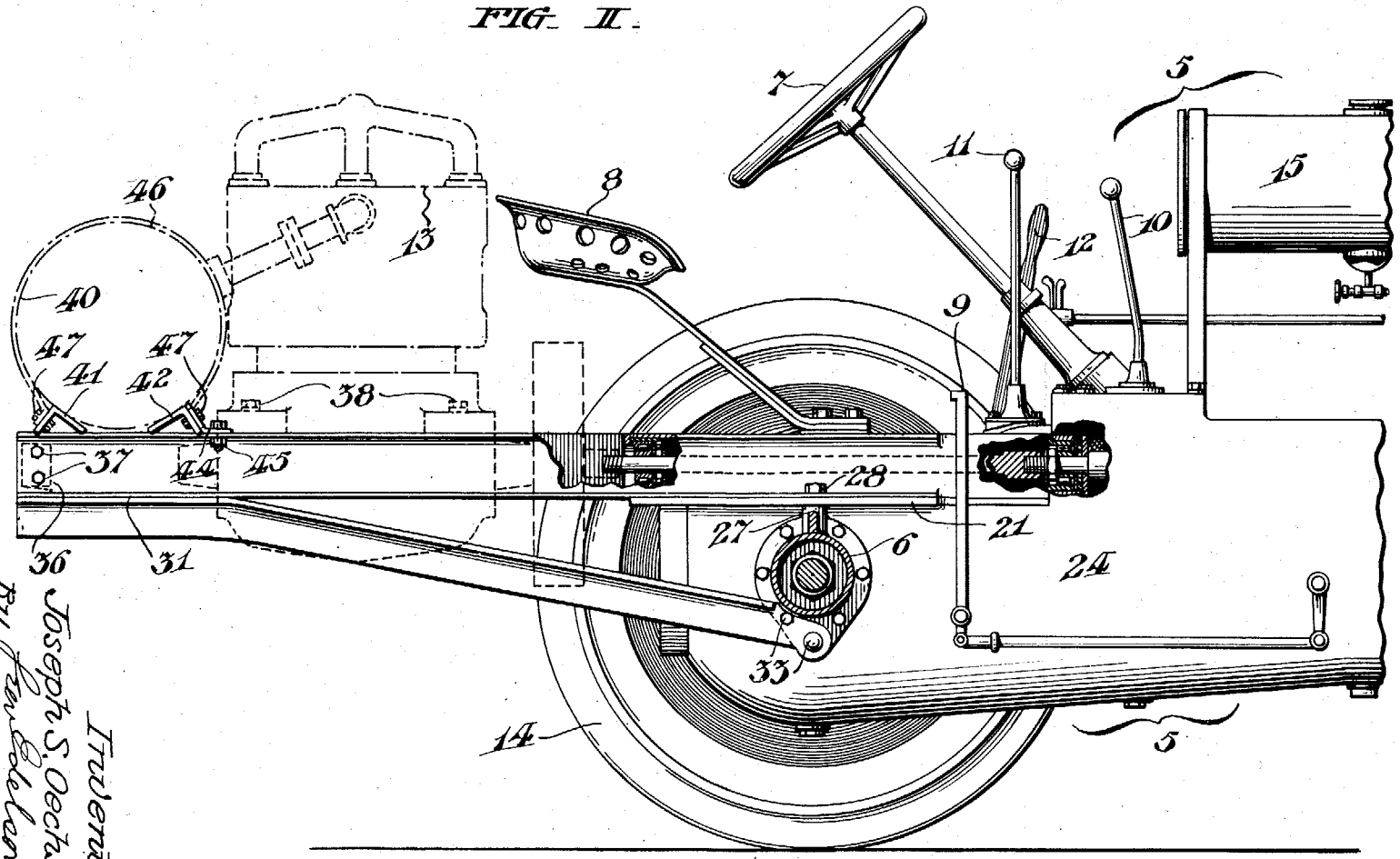
FIG. II.
Inventor:
Joseph S. Oechsle,
By Fred Edelson
Attorney.

Feb. 5, 1929. Re. 17,209
J. S. OECHSLE
ATTACHMENT FRAME FOR MOBILE UNITS
Original Filed Aug. 26, 1925 3 Sheets-Sheet 3
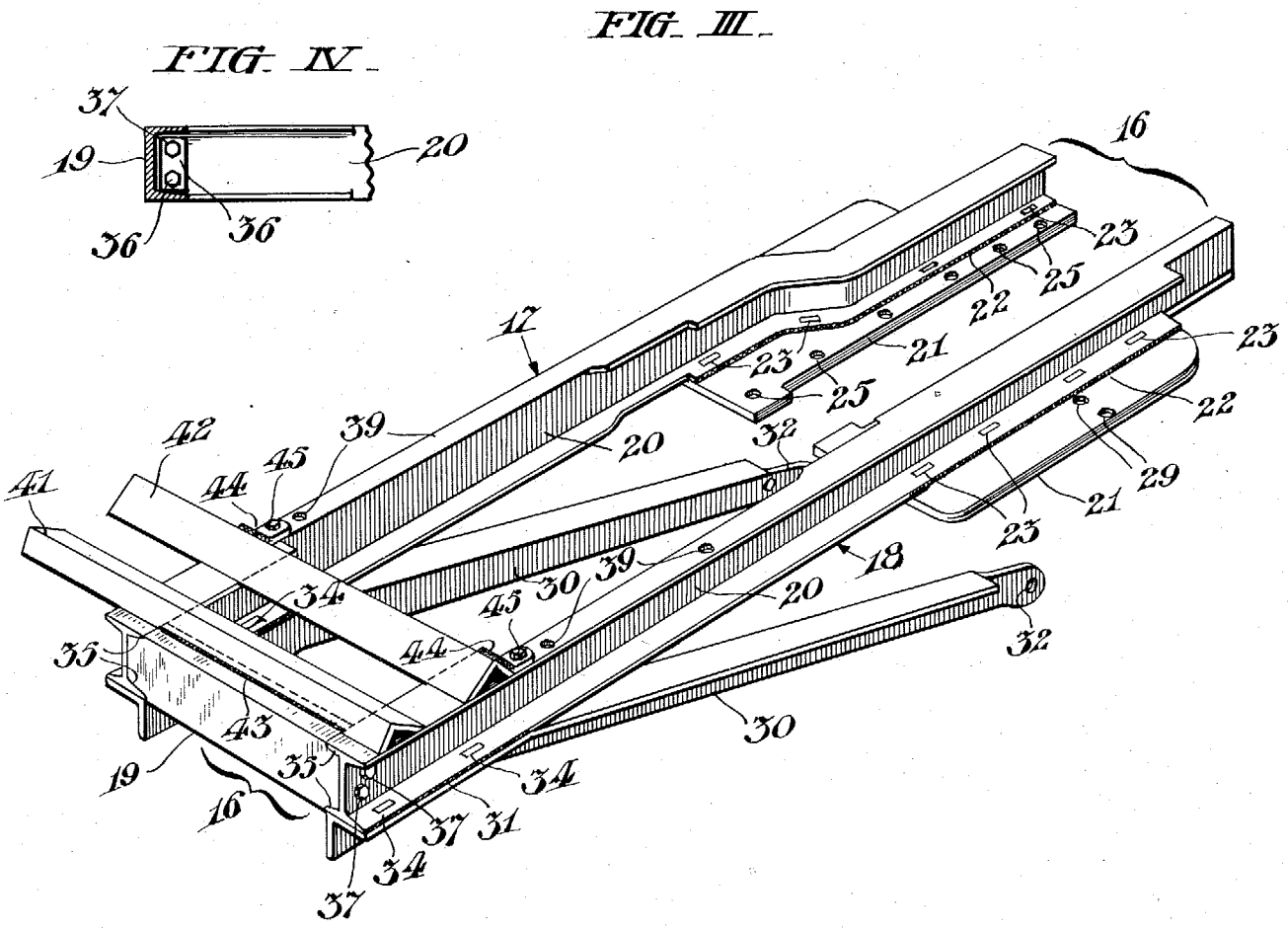
Inventor:
Joseph S. Oechsle,
By Fear Edelson
Attorney.

Reissued Feb. 5, 1929. Re. 17,209

UNITED STATES PATENT OFFICE.

JOSEPH S. OECHSLE, OF PHILADELPHIA, PENNSYLVANIA, ASSIGNOR TO METALWELD SERVICE CORPORATION, OF PHILADELPHIA, PENNSYLVANIA, A CORPORATION OF PENNSYLVANIA.

ATTACHMENT FRAME FOR MOBILE UNITS.

Original No. 1,653,020, dated December 20, 1927, Serial No. 52,562, filed August 26, 1925. Application for reissue filed October 27, 1928. Serial No. 315,573.

This invention relates generally to mobile units, that is to say, units adapted to some useful purpose while capable of propulsion under their own power from place to place, in contradistinction to those now commonly known as portable units, or which involve trailing from one sphere of operation to another. Units of the character first mentioned are of diversified types, but usually embody some utility and a source of propulsive power, said utility being operated by the source of power when the latter is disconnected or not engaged in transportation.

An object of this invention is to provide an attachment frame for rigid connection to a motive unit—such as a tractor for example—which is so designed as to ensure a non-vibratory support for the utility adapted for operation by the motive unit when not engaged in propulsion or travelling from place to place.

Another object of this invention is the provision of an attachment frame component characterized by great strength and ease of connection or disconnection to the crank case and rear axle housings of standard types of tractors whereby said tractors are adapted to include a work utility or the like and operate the same with maximum economy.

A further object of this invention is the cheap and economical conversion of standard tractors into mobile units including one or more utilities adapted for operation thereby.

With the foregoing and other objects in view, which will be apparent from the following description, this invention essentially consists of the matters hereinafter set forth, typically exemplified in the accompanying sheets of drawings, and circumscribed as to subject matter and scope by the appended claims.

In the drawings:

Figure 2 is a side elevation of the preceding figure;

Figure 3 is a perspective view of the attachment frame with minor parts broken away for the sake of clearness; and, Figure 4 is a fragmentary detail of a portion of the attachment frame, later on fully explained.

Figure 1:
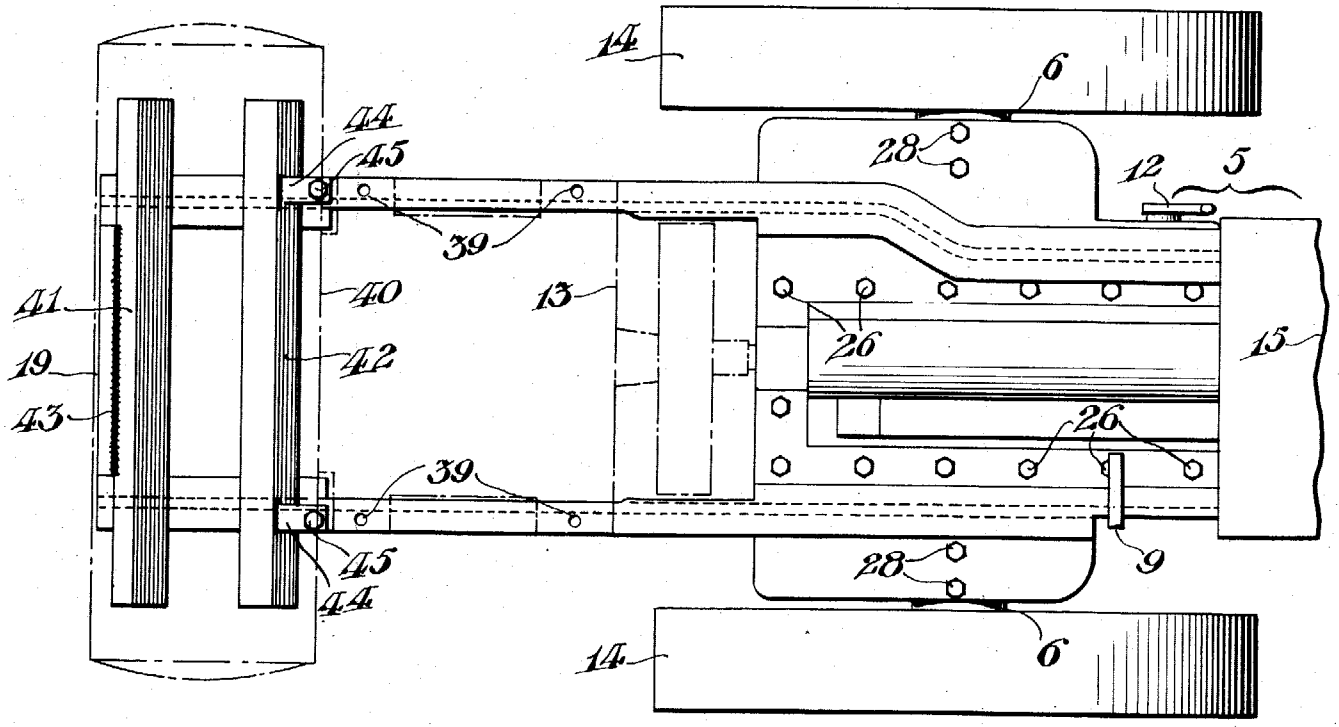
Figure 1 is a top plan view of my novel attachment frame as adapted to a standard type of tractor, a portion whereof is fragmentarily shown, while the associated utility is indicated diagrammatically by dot-and-dash outline so as not to confuse the illustration.

For the sake of practical explanation as to one convenient application of the present invention I have elected—by way of example only—to describe the same as adapted to a mobile compressor unit, but it is to be distinctly understood that I am in no sense limited thereby.

Referring more specifically to the drawings, on which like reference numerals are applied to corresponding parts in all the views, it will be observed that the rear portion of a standard type of tractor is comprehensively designated 5, while the numeral 6 indicates the rear axle housings. 7 is the steering wheel, 8 the operator's seat, 9 the foot brake, 10 the gear shift, 11 the clutch control, and 12 the lever which connects or disconnects the compressor 13, as later on explained. The rear wheels of the tractor 5, are designated 14 while a portion of the fuel tank is shown at 15. As the foregoing parts are old and well known, further explanation thereof is deemed unnecessary herein, and they are but briefly enumerated as essential to a full comprehension of my invention, now to be described in detail.

As best appreciated from Figure 3, it will be noted that, in the main, this invention comprises a framework attachment, comprehensively designated 16, and comprising opposed side units 17, 18, detachably connected at their rear ends by a transverse member 19. Each side unit 17, 18, it will be seen, consists, conveniently though not essentially, of a standard I-beam or longitudinal 20, that is cut away and shaped as later on fully explained, with a sub-plate 21 welded to the fore basal flanges thereof at 22, as well as rigidly united by spot weldings 23, through said basal flanges at each side of the web thereof. These sub-plates 21, it is to be particularly remarked, thus become incorporated base flanges of the I-beams 20 and they are configured to snugly conform to the crank case 24 of the tractor 5. In addition to the foregoing, the sub-plates 21 are provided with a series of holes 25 adjacent their inner edges for substitute bolts 26—Figure 1—which pass through the ordinary flange holes of the crank case and cover, as will be well understood by anyone acquainted with tractors. Furthermore, the type of tractor illustrated is provided on the rear axle housings 6 with vertical offsets 27—Figure 2—and these I bore and tap to receive studs 28 passed through holes 29—Figure 3—in the aforesaid sub-plates 21. Thus it will be seen that the side units 17, 18 are rigidly supported and connected to the tractor 5 in a manner effectively precluding any tendency to lateral or other displacement while affording rearwardly extending stable support for the compressor 13.

In order to rigidly brace the side units 17, 18 against vertical deflection, I weld obliquely disposed angles or channels 30 to the lower rear flanges of the I-beams 20 at 31; said angles or channels 30 being cut away and shaped at their forward ends to provide eye-pieces 32 which are bolted or otherwise secured at 33 to the flange of the juxtapositioned axle housing 6, as clearly shown in Figure 2. Attention is also directed to the fact that I additionally unite the brace members 30 rigidly to the base flanges of the I-beams 20 by spot weldings 34—Figure 3.

By so welding the brace members 30 to the longitudinals 20, I provide in effect a horizontally disposed unitary frame assembly adapted to be secured to the tractor unit in rearwardly extending relation with respect thereto, it being particularly noted that this assembly is of generally U-shape having side sections each of which latter is characterized by the provision of upper and lower portions converging toward the rear end of the assembly. By reason of the fact that the divergent fore ends of these portions of each side section are respectively provided with vertically spaced means for securing said ends to corresponding spaced parts of the tractor unit, there is effectually precluded all tendency for the frame assembly to vibrate in a vertical direction when said assembly is connected to the tractor. It will be understood, of course, that the invention is not limited to the particular means herein shown and described for connecting said divergent fore ends of each side section to the tractor unit and that any other equivalent means may be employed with equal effectiveness.

Referring now to the rear transverse member 19, the same is conveniently cut from a standard channel section to snugly seat at 35—Figure 3—between the upper and lower flanges of the I-beams 20, and it has angle clips 36—Figure 4—welded thereto by means of which it is secured in place between the side units 17, 18 through the medium of bolts 37. Thus it will be readily seen that the side units 17, 18 are transversely braced in a rigid manner at their rear ends, and thereby afford a secure bearing for the compressor 13 which is mounted thereon and secured in place by bolts 38—Figure 2—passing through holes 39 in the top flanges of the I-beams 20—Figure 3. Obviously additional transverse channels may be fitted at intervals intermediate the side units 17, 18 where deemed necessary.

As the specific form of unit illustrated involves a storage tank 40 for the compressed air produced by the compressor 13, I afford chock spacers therefor in the form of transversely disposed angle irons 41, 42 of sufficient length. These angle irons 41, 42, it will be seen, extend beyond the side lines of the attachment frame 16, and the former 41 is integrally welded at 43 to the top flange of the transverse member 19, while the latter has angle clip 44 welded thereto with provision for bolting connection 45 to the aforesaid I-beams 20, as will be readily understood. The storage tank is secured to the chock spacers 41, 42 by removable straps 46 and bolts 47, in the well known manner.

From the foregoing it will be seen that the attachment frame 16 extends rearwardly from the tractor 5, and that it forms and constitutes a rigid support for the compressor 13 which is operated by a direct drive connecting shaft 48—Figure 2—from the tractor transmission, and that it can be connected or disconnected from operation therefrom by the lever 12, aforesaid.

From the foregoing description, taken in connection with the accompanying drawings, the construction and manner of mounting or dismantling my novel attachment frame will be well understood without further detailed explanation, while its ready adaptability for compact shipment is self evident. Furthermore, changes in the form, proportions and minor details, obviously, may be made within the scope of my invention without departing from the spirit or sacrificing any of the advantages thereof, particularly in so far as the cutting away of the I-beam—20—flanges is concerned to conform to different types of prime movers, as well as to accommodate other utilities than that specifically illustrated. Accordingly the right is hereby reserved to make all such reasonable changes as are fairly circumscribed by the scope of the subjoined claims.

What is claimed as new and useful is:

1. An attachment frame of the type described comprising spaced I-beams having their forward lower flanges reinforced by coplanar sub-plates with the rear ends transversely connected by a detachable standard section, and obliquely disposed bracing members rigidly secured to the rear lower flanges of said I-beams.

2. An attachment frame of the type described comprising spaced I-beams having their forward lower flanges reinforced by laterally projecting sub-plates with the rear ends transversely connected by a detachable standard section, and obliquely disposed standard section bracings integrally welded to the rear lower flanges of the I-beams.

3. An attachment frame of the type described comprising spaced I-beams having their forward ends reinforced by sub-plates integrally welded in planar abutment on the lower flanges thereof, a transverse channel detachably connecting the rear ends of said I-beams, and obliquely disposed standard section bracing members integrally secured to the rear lower flanges of said I-beams.

4. An attachment frame of the type described comprising spaced I-beams having their forward ends reinforced by sub-plates integrally united to the lower flanges thereof, said plates being configured to fit and be attachable to the crank case flanges of a standard tractor, a transverse channel-member detachably connecting the rear ends of the aforesaid I-beams, and obliquely disposed bracing members integrally attached to the rear lower flanges of said I-beams.

5. An attachment frame of the type described comprising spaced I-beams having at their forward ends sub-plates integrally united to the lower flanges thereof, said I-beams and sub-plates being respectively shaped to mount a work unit and configured for attachment to the crank-case of a standard tractor, a transverse channel-member detachably connecting the rear ends of the I-beams, and obliquely disposed bracing members integrally attached to the rear lower flanges of said I-beams.

6. An attachment frame of the type described comprising spaced I-beams having at their forward ends sub-plates integrally united to the lower flanges thereof, said I-beams and sub-plates being respectively shaped to mount a work unit and configured for attachment to the crank-case of a standard tractor, a transverse channel-member having its ends shaped to engage between the flanges of—and be detachably connected to—the rear end webs of the I-beams, and obliquely disposed standard-section bracings integrally united to the rear lower flanges of said I-beams with their free ends cut away and apertured to constitute eye-pieces for connection to the tractor rear axle housings.

7. An attachment frame of the type described comprising spaced I-beams having sub-plates integrally united to the lower flanges at one end thereof, said I-beams and sub-plates being respectively shaped to mount and conform with a work unit and coordinated tractor, a transverse channel-member having an inverted angle section chock welded longitudinally of its upper flange and similarly connected clips integral with the web whereby the rear ends of the I-beams are detachably connected, and obliquely disposed standard-section braces integrally united to the rear lower flanges of said I-beams with their free ends affording eye-pieces for attachment to the tractor rear axle housings.

8. An attachment frame of the type described comprising spaced I-beams having sub-plates integrally united to the lower flanges at one end thereof, said I-beams and sub-plates being respectively shaped to mount and conform with a work unit and coordinated tractor, a transverse channel-member having an inverted angle section chock welded longitudinally of its upper flange and similarly connected clips integral with the web whereby the rear ends of the I-beams are detachably connected, a second angle-section chock having integral clips whereby it is secured transversely of the attachment frame, and obliquely disposed standard-section braces integrally united to the rear lower flanges of said I-beams with their free ends affording eye-pieces for attachment to the tractor rear axle housings.

9. As a unit for attachment frames of the type described, an I-beam having a sub-plate integrally secured co-planar to the lower flange at one end thereof, and an obliquely disposed standard-section brace similarly united to the rear lower flange at the other end with the free end thereof fashioned into eye-piece formation.

10. As a unit for attachment frames of the type described, an I-beam having a sub-plate integrally secured co-planar to the lower flange at one end thereof, and an obliquely disposed standard-section brace similarly united to the rear lower flange at the other end with the free end thereof fashioned into eye-piece formation, the aforesaid I-beam and sub-plate having their longitudinal edges shaped and configured for the purposes hereinbefore set forth.

11. An attachment frame of the type described comprising spaced beams of standard section having their forward ends reinforced by co-planar sub-plates, and obliquely disposed bracing members rigidly secured to the rear ends of said beams.

12. An attachment frame of the type described comprising spaced beams of standard section having their forward ends reinforced by laterally projecting sub-plates, and obliquely disposed standard section bracings integrally welded to the rear ends of said beams.

13. An attachment frame of the type described comprising spaced I-beams having their forward ends reinforced by sub-plates integrally welded in planar abutment on the lower flanges thereof, a transverse member interconnecting the rear ends of said I-beams, and obliquely disposed standard section bracing members integrally secured to the rear lower flanges of said I-beams.

14. An attachment frame of the type described comprising spaced I-beams having their forward ends reinforced by sub-plates integrally united to the lower flanges thereof, said plates being configured to fit and be attachable to the crank case flanges of a standard tractor, and obliquely disposed bracing members integrally attached to the rear lower flanges of said I-beams.

15. As a unit for attachment frames of the type described, a beam of standard section having an inwardly projecting sub-plate integrally secured to the fore end thereof, and an obliquely disposed standard-section brace similarly united to the rear end of said beam, said brace having the free end thereof fashioned into eye-piece formation.

16. As a unit for attachment frames of the type described, a longitudinal having laterally projecting means at the fore end thereof for securement to the crank case of a standard tractor, and an obliquely disposed brace having one end thereof secured to the rear end of said longitudinal, the opposite end of said brace being provided with means for attachment to the tractor rear axle housing.

17. A unitary frame assembly for securement to the rear of a tractor unit comprising a pair of transversely connected longitudinals lying in a common horizontal plane, means provided at the forward ends of said longitudinals for removably attaching said frame assembly in rearwardly extending relation to said tractor unit, and auxiliary attaching means integrally united to said longitudinals and arranged in vertically spaced relation with respect to said first-mentioned means.

18. In combination with a tractor unit, a frame assembly including a rearwardly extending section the fore end of which is arranged for securement to the rear end of said unit, said section including upper and lower portions which converge toward the rear end thereof.

19. In combination with a tractor unit, a unitary frame assembly including a rearwardly extending side member, said member being provided with an integral offset portion, means for securing said member to said tractor unit in rearwardly extending relation with respect thereto, and auxiliary means in said offset portion for additionally securing said member to said unit, said auxiliary means being spaced vertically from said first-mentioned means.

20. An attachment frame of the type described comprising a pair of transversely connected longitudinals, the fore ends of which are adapted for connection to the crank-case of a standard tractor, and obliquely disposed bracing members integrally united to said longitudinals and having means in their fore ends for securement to the tractor rear axle housings.

21. An attachment frame of the type described comprising a pair of transversely connected longitudinals disposed in a substantially horizontal plane, means at the fore ends of said longitudinals for adapting the same for connection to the crank case of a standard tractor, and means integrally united to said longitudinals and spaced vertically from the fore ends thereof for attachment to a separate part of said tractor.

22. In an attachment frame of the type described, a substantially U-shaped unitary assembly including longitudinally extending side sections and a transversely extending rear section, said side sections being disposed in substantially parallel vertical planes and being each vertically divergent from said rear section toward the fore ends thereof, and means provided at the divergent fore ends of each of said side sections for securing said assembly upon a standard tractor in rearwardly extending relation with respect thereto.

23. An attachment frame of the type described comprising spaced longitudinals of standard section having their rear ends transversely connected, the fore ends of said longitudinals being arranged to embrace and adapted for securement to the rear end of a standard tractor, and obliquely disposed bracing members extending forwardly from the rear ends of said longitudinals for attachment to the tractor rear axle housings.

In testimony whereof, I have hereunto affixed my signature.

JOSEPH S. OECHSLE.